(12) United States Patent
Ono

(10) Patent No.: US 11,134,164 B2
(45) Date of Patent: Sep. 28, 2021

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Yusuke Ono, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 252 days.

(21) Appl. No.: 16/209,973

(22) Filed: Dec. 5, 2018

(65) Prior Publication Data
US 2019/0281176 A1 Sep. 12, 2019

(30) Foreign Application Priority Data
Mar. 6, 2018 (JP) .............................. JP2018-039761

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |
| *H04N 1/32* | (2006.01) |

(52) U.S. Cl.
CPC ....... *H04N 1/00915* (2013.01); *H04N 1/0097* (2013.01); *H04N 1/00244* (2013.01); *H04N 1/00307* (2013.01); *H04N 1/32101* (2013.01); *H04N 2201/0094* (2013.01)

(58) Field of Classification Search
CPC .......... H04N 1/00915; H04N 1/00244; H04N 1/00307; H04N 1/0097; H04N 1/32101; H04N 2201/0094
USPC ............................... 358/1.15, 1.13, 1.14, 1.1
See application file for complete search history.

(56) References Cited

U.S. PATENT DOCUMENTS

| | | | |
|---|---|---|---|
| 2008/0231887 A1* | 9/2008 | Sakagami | G06F 3/1238 358/1.15 |
| 2015/0312427 A1* | 10/2015 | Roulland | G06F 11/0793 358/1.15 |
| 2019/0004759 A1* | 1/2019 | Niimoto | G06F 3/1207 |
| 2019/0075460 A1* | 3/2019 | Sakamoto | H04L 63/104 |
| 2019/0370359 A1* | 12/2019 | Diaz | G06F 9/547 |

FOREIGN PATENT DOCUMENTS

| | | |
|---|---|---|
| JP | 5103327 | 12/2012 |
| JP | 2017130071 | 7/2017 |
| JP | 2017167836 | 9/2017 |

* cited by examiner

*Primary Examiner* — Douglas Q Tran
(74) *Attorney, Agent, or Firm* — JCIPRNET

(57) ABSTRACT

An information processing apparatus includes a collecting unit that collects data from communication equipment; a transmission unit that transmits the data to an external apparatus; an execution unit that executes a function of the information processing apparatus; an association unit that associates the function with the collected data; and a control unit that controls the transmission unit so as to transmit the data associated with the executed function to the external apparatus.

8 Claims, 6 Drawing Sheets

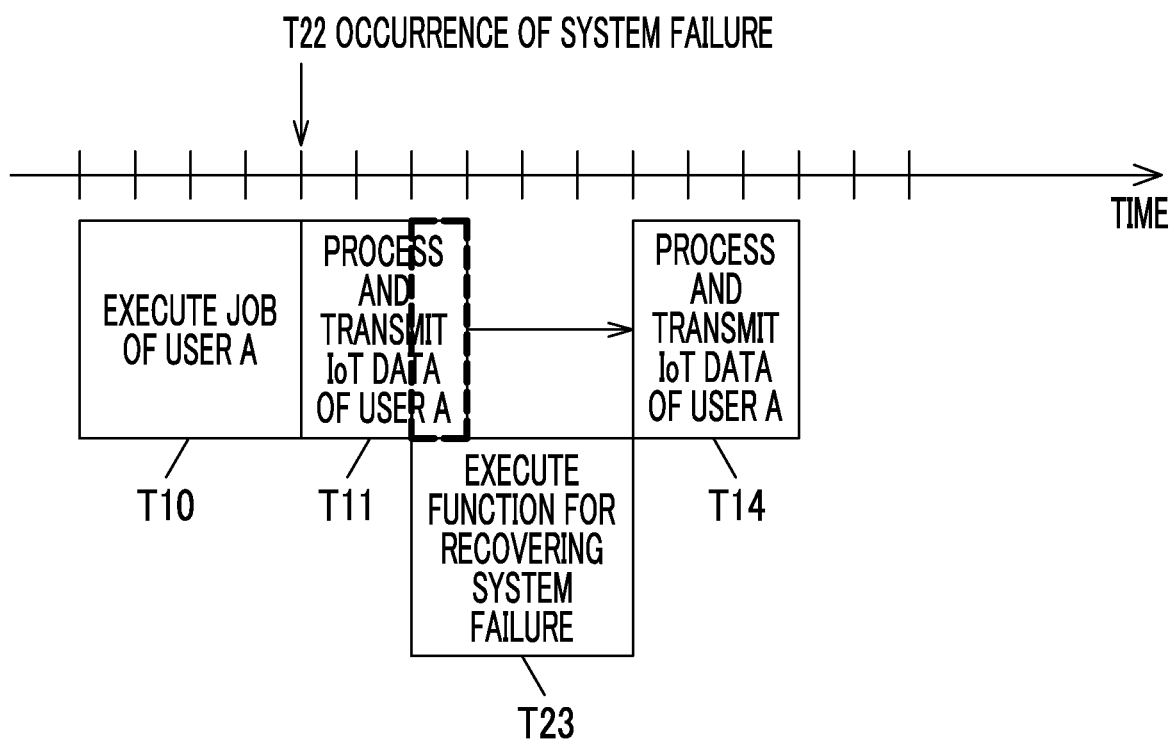

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-039761 filed Mar. 6, 2018.

BACKGROUND

(i) Technical Field

The present invention relates to an information processing apparatus and a non-transitory computer readable medium storing a program.

(ii) Related Art

In recent years, an information processing apparatus having a function (hereinafter, also referred to as "edge function") which primarily processes data having enormous capacity before transmitting the data to an external apparatus such as a server device has been proposed (for example, see JP5103327B).

The information processing apparatus described in JP5103327B is an image forming apparatus which forms an image based on a function (hereinafter, also referred to as "job") related to image formation and includes a CPU that controls the operation of the image forming apparatus according to the operating condition set in the image forming apparatus, a job management table that sequentially registers jobs that have been input according to priority, and a job execution control section that determines whether to authorize the execution of the jobs according to the order of registration, starting from a job with a highest priority registered in the job management table, and the job execution control section calculates the use rate of the CPU associated with the execution of the job, based on the job condition of the job subject to the authorization determination, limits the operating condition of the image forming apparatus in a case where the calculated use rate of the CPU exceeds a predetermined value, and authorizes the execution of the job according to the limited operating condition in a case where the use rate of the CPU when the operating condition is limited becomes the predetermined value or less.

SUMMARY

Aspects of non-limiting embodiments of the present disclosure relate to an information processing apparatus and a non-transitory computer readable medium storing a program, which are capable of efficiently processing data while suppressing deterioration of the processing capability of functions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a collecting unit that collects data from communication equipment; a transmission unit that transmits the data to an external apparatus; an execution unit that executes a function of the information processing apparatus; an association unit that associates the function with the collected data; and a control unit that controls the transmission unit so as to transmit the data associated with the executed function to the external apparatus.

BRIEF DESCRIPTION OF THE DRAWINGS

Exemplary embodiment(s) of the present invention will be described in detail based on the following figures, wherein:

FIGS. 7A and 7B are diagrams schematically illustrating an example of control of a job and IoT data, FIG. 7A is a diagram illustrating an example in a case where a job execution request is made during transmission of the IoT data, and FIG. 7B is a diagram illustrating an example in a case where an urgent execution request is made during the transmission of the IoT data.

DETAILED DESCRIPTION

Figure 1:
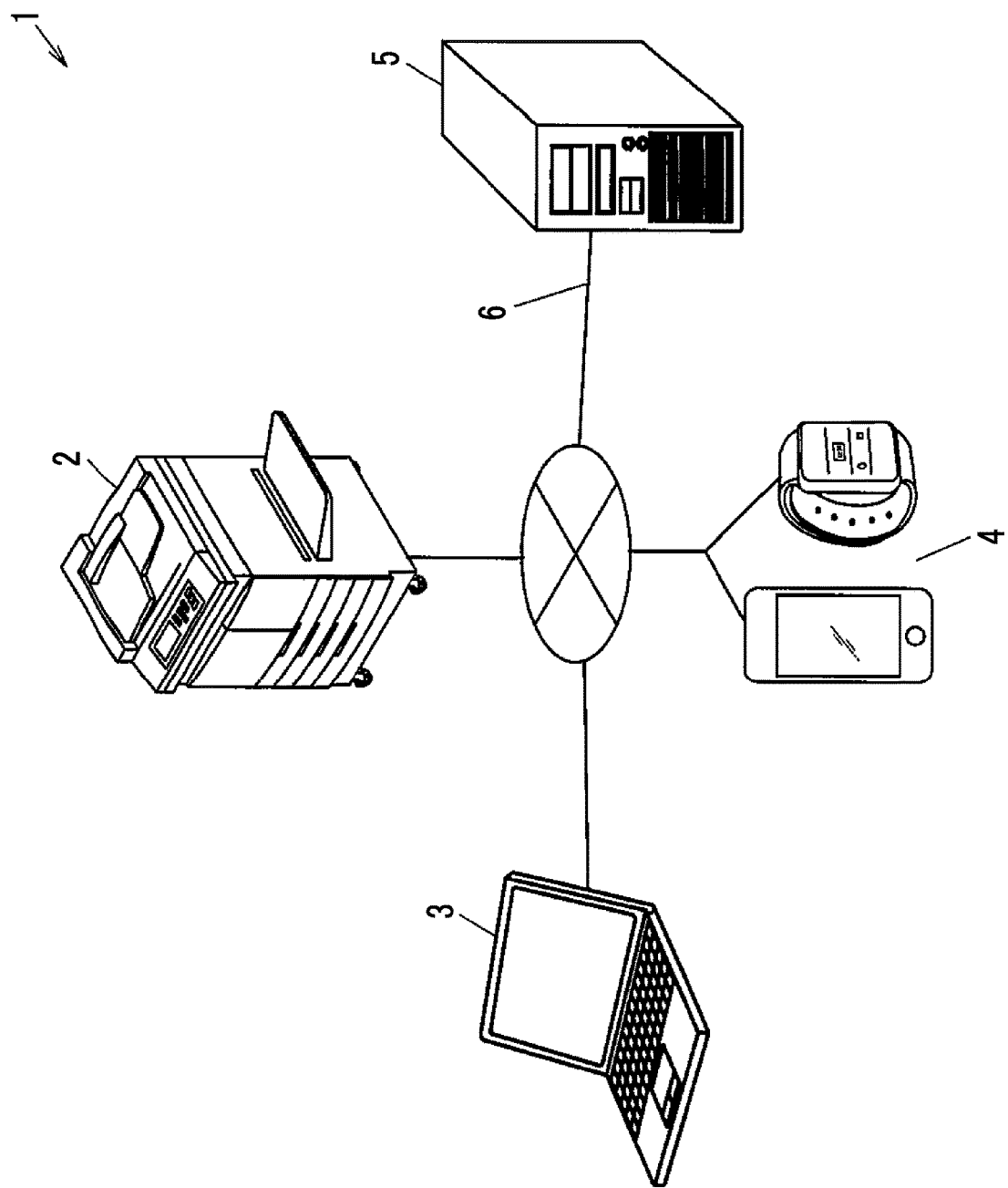
FIG. 1 is a diagram illustrating a configuration example of an image forming system according to an exemplary embodiment of the present invention.

Hereinafter, exemplary embodiments of the present invention will be described with reference to the drawings. In the drawings, the same reference numerals are attached to substantially the same constituent elements, and duplicated explanations are omitted. Hereinafter, the image forming system will be described as an example of the information processing system, but the information processing system is not limited to the image forming system. Further, the image forming apparatus will be described as the information processing apparatus, but the information processing apparatus is not limited to the image forming apparatus.

Summary of Exemplary Embodiment

An image forming apparatus according to the present exemplary embodiment includes a collecting unit that collects data from communication equipment; a transmission unit that transmits the data to an external apparatus; an execution unit that executes a function of the image forming apparatus; an association unit that associates the function with the collected data; and a control unit that controls the transmission unit so as to transmit the data associated with the executed function to the external apparatus.

Communication equipment having a communication function corresponds to, for example, an IoT device that acquires IoT data. The function of the communication equipment includes, for example, a scan function, a print function, a copy function, a facsimile function, an e-mail function, and the like. The external apparatus corresponds to, for example, a server device. The association unit associates the above function with the collected IoT data.

intervals. The IoT data is an example of data. An example of the IoT device 4 is shown in Table 1.

TABLE 1

| No. | Data type | | Data example | IoT device example |
|---|---|---|---|---|
| 1 | Main information | Presence information | Time record | Time recorder |
| 2 | | Position information | Coordinate | GPS |
| 3 | | Motion information | Acceleration | Acceleration sensor |
| 4 | Peripheral information | Image information | Pixel value | Camera (light receiving sensor) |
| 5 | | Sound information | Speech waveform | Microphone |
| 6 | | Environment information | Temperature Humidity | Temperature sensor Humidity sensor |
| 7 | User information | Physical information | Body temperature Pulse Blood pressure Brain wave electroencephalogram | Thermometer Infrared sensor Sphygmomanometer Electroencephalograph |
| 8 | | Behavior information | Step count | Pedometer |

Exemplary Embodiment

FIG. 1 is a diagram illustrating a configuration example of an image forming system according to an exemplary embodiment of the present invention. The image forming system 1 is configured to include an image forming apparatus 2, a terminal device 3, an IoT device 4, and a server device 5. The image forming apparatus 2 is connected to the terminal device 3, the IoT device 4, and the server device 5 through a network 6.

The image forming system 1 is an example of an information processing system. The image forming apparatus 2 is an example of an information processing apparatus. The IoT device 4 is an example of communication equipment. In addition, FIG. 1 illustrates the image forming system 1 including one image forming apparatus 2, one terminal device 3, one IoT device 4, and one server device 5, as an example, but the number of apparatuses and devices is not limited to one.

The image forming apparatus 2 is, for example, a multi-function peripheral having plural functions such as a scan function, a print function, a copy function, a facsimile function, and an e-mail function. In addition, the image forming apparatus 2 may have any two of the functions described above and is not limited to a multifunction peripheral.

As the terminal device 3, for example, a personal computer, a tablet type terminal, a multifunctional mobile phone (smartphone), or the like may be used. The terminal device 3 is also an example of the IoT device 4 to be described later, but they are distinguished and exemplified in the present exemplary embodiment.

The IoT device 4 is equipment that acquires various types of IoT data having a communication function. In addition, the IoT device 4 continuously transmits the acquired IoT data to the image forming apparatus 2 at predetermined time These are the illustrative list of the IoT device 4, and the IoT device 4 is not limited to the above.

The IoT device 4 corresponds to for example, a multifunctional mobile phone (smartphone) or a wearable type electronic equipment (smart watch) or the like worn so as to cover the wrist, finger, arm, or entire hand of the user.

The server device 5 comprehensively analyzes the IoT data acquired by the IoT device 4, the log data of the job of the image forming apparatus 2, data concerning the object to be subject to the execution of the job of the image forming apparatus 2, and the like, and provides a solution to a specific problem (for example, improvement of a business flow, or the like). For example, a cloud server device corresponds to the server device 5. The server device 5 is an example of the external apparatus.

The network 6 is, for example, a local area network (LAN), the Internet, an intranet, or the like, and may be wired or wireless.

Configuration of Image Forming Apparatus

Figure 2:
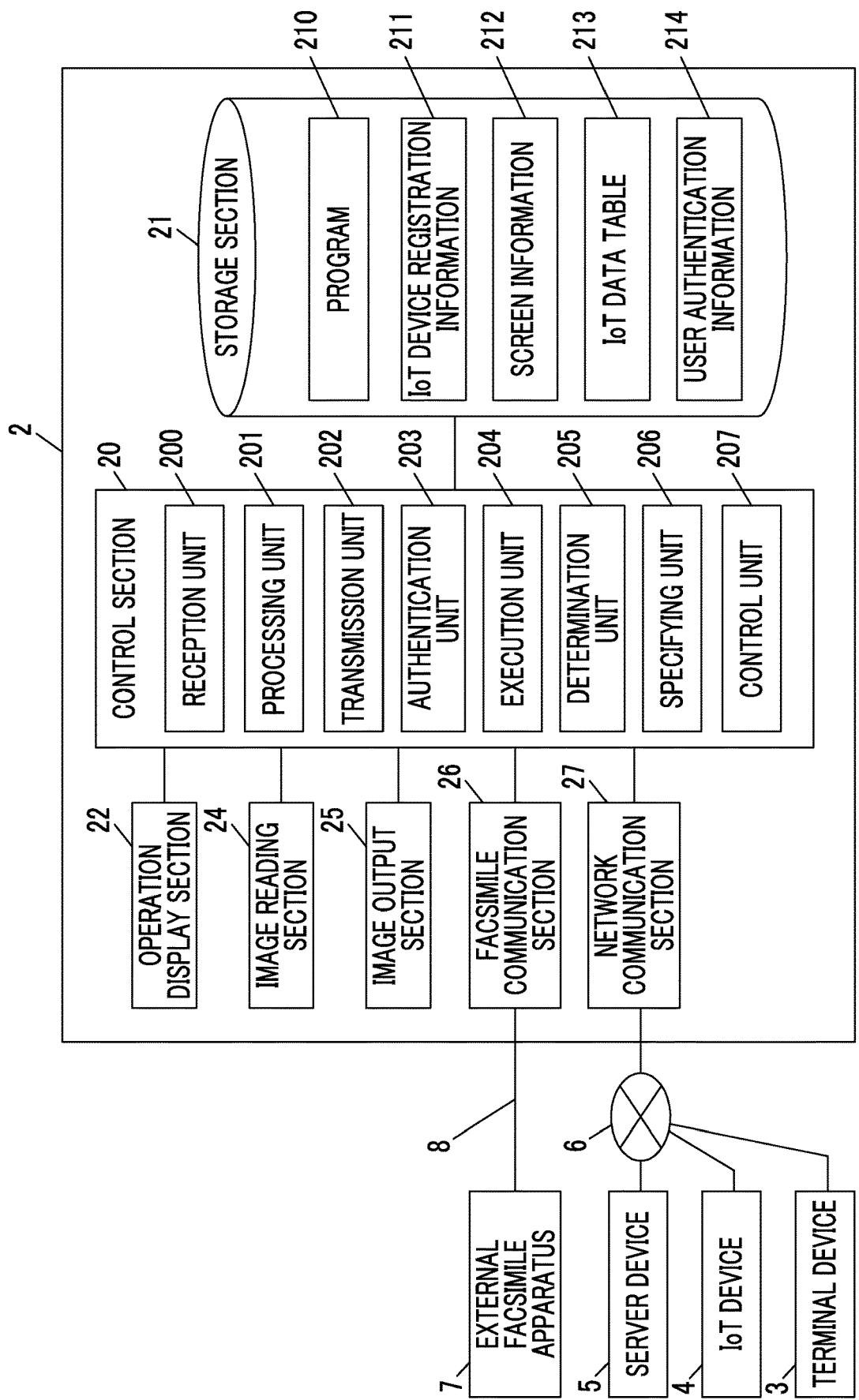
FIG. 2 is a block diagram illustrating an example of a control system of an image forming apparatus illustrated in FIG. 1.

FIG. 2 is a block diagram illustrating an example of a control system of the image forming apparatus 2. The image forming apparatus 2 includes a control section 20 that controls each section, a storage section 21 that stores various types of data, an operation display section 22 that inputs and displays information, an image reading section 24 that reads a document image from a document, an image output section 25 that printing out an image, a facsimile communication section 26 that performs facsimile transmission and reception through a public circuit network 8 to an external facsimile apparatus 7, and a network communication section 27 that communicates with the terminal device 3, the IoT device 4 and the server device 5 through the network 6.

Control Section 20

The control section 20 includes a central processing unit (CPU), an interface, and the like. By operating according to the program 210 stored in the storage section 21, the CPU functions as a reception unit 200, a processing unit 201, a transmission unit 202, an authentication unit 203, an execution unit 204, a determination unit 205, a specifying unit 206, a control unit 207, and the like. The reception unit 200 is an example of the collecting unit. The specifying unit 206 is an example of the association unit. Details of each of units 200 to 207 will be described later.

Storage Section 21

The storage section 21 includes a read only memory (ROM), a random access memory (RAM), a hard disk, and the like, and stores various types of data such as a program 210, an IoT device registration information table 211 (see FIG. 3), screen information 212, IoT data table 213, and a user authentication information table 214. Hereinafter, in the present specification, "recording" or "registration" is used in a case where information is written into a table, and "storage" is used in a case where information is written into a storage section. The storage section 21 is an example of a storage unit.

1. Configuration of IoT device registration information table 211

Figure 3:
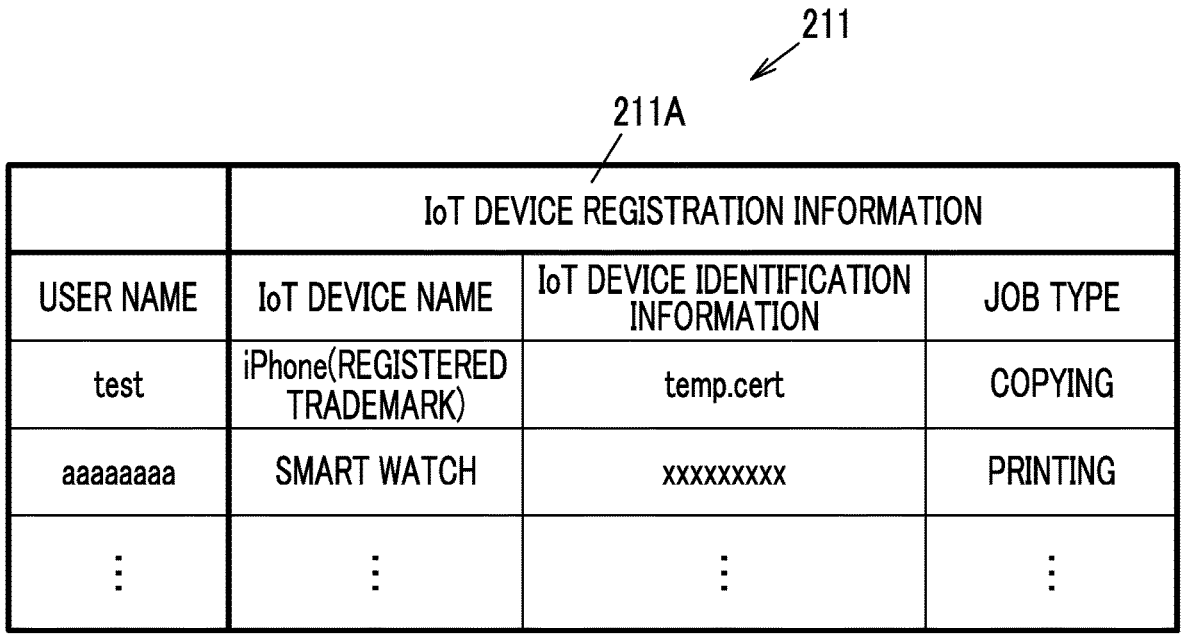
FIG. 3 is a diagram illustrating an example of an IoT device registration information table.

FIG. 3 is a diagram showing an example of the IoT device registration information table 211. In the IoT device registration information table 211, information indicating a user, information indicating an IoT device 4, and information indicating a job type are associated with each other and registered. In other words, the IoT device 4 and a specific job type are registered in association with each other through information indicating a user. Hereinafter, information in which the information indicating a user, the information indicating an IoT device 4, and the information indicating a job type are associated with each other is also referred to as "IoT device registration information 211A". The IoT device registration information 211A is an example of related information.

The IoT device registration information table 211 is provided with a "user name" field, an "IoT device name" field, an "IoT device identification information" field, and a "job type" field. In the "user name" field, the user name is registered as information indicating the user. Here, "user" refers to an operator who performs an execution request for executing a job. The user may be a user who uses the IoT device 4. Note that the information indicating the user is not limited to "user name", and, for example, a user ID for identifying a user may be used.

In the "IoT device name" field, for example, the equipment name of the IoT device 4 is registered as information indicating the IoT device 4. In the "IoT device identification information" field, identification information for identifying the IoT device 4 is registered. The identification information of the IoT device 4 includes, for example, a device certificate unique to the IoT device 4, a serial number, a password, and the like. In the "job type" field, information indicating a specific function selected from the function of the above-described image forming apparatus 2 is registered.

2. Screen Information 212

The screen information 212 is information on various screens displayed on the display surface (not shown) of the operation display section 22. The screen information 212 includes, for example, information on the IoT device registration screen 9 (see FIG. 4).

Figure 4:
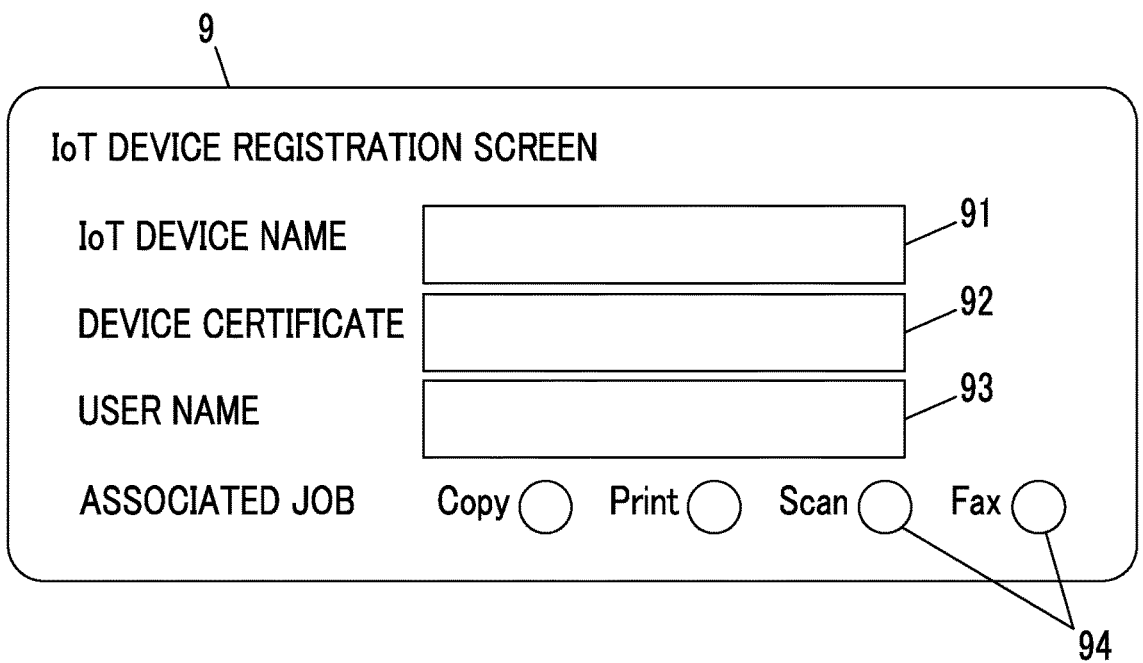
FIG. 4 is a diagram illustrating an example of an IoT device registration screen.

FIG. 4 is a diagram showing an example of the IoT device registration screen 9. The IoT device registration screen 9 is a screen for the user to register the IoT device registration information 211A. As illustrated in FIG. 4, the IoT device registration screen 9 includes, for example, a first input field 91 for inputting an IoT device name, a second input field 92 for inputting information on device certificate as IoT device identification information, a third input field 93 for inputting the name of a user using the IoT device 4, a selection button 94 for selecting a job type associated with the IoT device 4 or the user, and the like. The information pieces input from the IoT device registration screen 9 are associated with each other and registered in the IoT device registration information table 211 of the above-described storage section 21.

3. IoT data table 213

In the IoT data table 213, various types of IoT data acquired by the IoT device 4 are registered in association with the identification information of the IoT device 4 from which the IoT data is acquired and information indicating the user who uses the IoT device 4.

4. User Authentication Information Table 214

In the user authentication information table 214, information (hereinafter, also referred to as "user authentication information") for authenticating the user when the user logs into the image forming apparatus 2 is registered. The user authentication information includes, for example, a user ID, a user name, a password, and the like.

Operation Display Section 22

The operation display section 22 is, for example, a touch panel display, and has a configuration in which a touch panel is overlapped and arranged on a display such as a liquid crystal display.

Image Reading Section 24

The image reading section 24 reads the document image from the document and includes an automatic document feeder provided on a document platen and a scanner, and optically reads a document image from a document placed on the document platen or a document sent by the automatic document feeder.

Image Output Section 25

The image output section 25 prints out a color image or a monochrome image on a recording medium such as paper by, for example, an electrophotographic method, an inkjet method, or the like.

Facsimile Communication Section 26

The facsimile communication section 26 modulates and demodulates data according to the facsimile protocols such as G3 or G4 and performs facsimile communication through the public circuit network 8.

Network Communication Section 27

The network communication section 27 is realized by a network interface card (NIC), Wi-Fi, BlueTooth (registered trademark), or the like, and transmits and receives signals to and from the terminal device 3, the IoT device 4 and the server device 5 through the network 6.

Respective units 200 to 207

Next, details of respective units 200 to 207 constituting the control section 20 will be described. The reception unit 200 receives IoT data transmitted from the IoT device 4 through the network 6. Further, the reception unit 200 registers the received IoT data in the IoT data table 213 of the storage section 21 in association with the information indicating the user and the identification information of the IoT device 4. Note that a series of operations including reception of IoT data by the reception unit 200 and storage of it in the storage section 21 is also referred to as "collection of data". That is, the reception unit 200 collects IoT data transmitted from the IoT device 4.

In addition to the IoT data, the reception unit 200 receives, for example, various types of information (for example, job execution request or the like) transmitted from the terminal device 3 and the server device 5. Further, the reception unit 200 receives various types of operations performed on the screen displayed on the display surface of the operation display section 22 by the user.

The processing unit 201 performs a data process (hereinafter, also simply referred to as "process") of the IoT data received by the reception unit 200. Specifically, the processing unit 201 performs a preprocess necessary for transmission of IoT data by a transmission unit 202 to be described later. As the preprocess, for example, the processing unit 201 performs an arithmetic process for obtaining arithmetic values such as an average value, a maximum value, and a minimum value of IoT data, a compression process for compressing IoT data to a predetermined capacity or less, and an encryption process for encrypting IoT data.

In addition to this, the preprocess may include, for example, an anonymization process for deleting or converting personal information included in IoT data, an abstraction process for grouping elements included in IoT data, and the like. In addition, the process performed by the processing unit 201 is performed as the preprocess of the comprehensive analysis process of data performed by the server device 5 and has the lighter load on the CPU than that of the analysis process, so that the process is also referred to as "primary process" as another expression.

The transmission unit 202 controls the network communication section 27 to transmit the IoT data processed by the processing unit 201 to the server device 5 through the network 6.

The authentication unit 203 performs authentication of the user based on the user authentication information input by the operation by the user. Specifically, the authentication unit 203 authenticates the user by comparing the user authentication information input by the operation by the user with the user authentication information registered in the user authentication information table 214 of the storage section 21.

In addition, "the user authentication information input by the operation by the user" is transmitted from the operation display section 22 when the user intends to log in to the image forming apparatus 2 directly from the operation display section 22 and is transmitted from the terminal device 3 when the user intends to log in to the image forming apparatus 2 remotely from the terminal device 3.

The execution unit 204 controls the image reading section 24, the image output section 25, the facsimile communication section 26, and the like to execute the functions of the image forming apparatus 2, that is, the scan function, the print function, the copy function, the facsimile function, and the like.

The determination unit 205 refers to the IoT device registration information table 211 of the storage section 21 and compares the type of the job executed by the execution unit 204 with the job type registered as the IoT device registration information 211A to determine whether or not they match.

The specifying unit 206 refers to the IoT device registration information table 211 and specifies the IoT device 4 associated with the type of the job executed by the execution unit 204. Further, the specifying unit 206 refers to the IoT data table 213 and specifies the IoT data transmitted from the specified IoT device 4. In other words, the specifying unit 206 associates a job executed by the execution unit 204 with the IoT data.

The control unit 207 controls the processing unit 201 to process the specific IoT data and controls the transmission unit 202 to transmit the processed IoT data to the server device 5. Specifically, the control unit 207 controls the processing unit 201 so as to process the IoT data associated with the executed job, after execution of the job by the execution unit 204 and controls the transmission unit 202 to transmit the processed IoT data to the server device 5.

Further, the control unit 207 controls the transmission unit 202 so as to preferentially transmit the specific IoT data to the server device 5. Further, the control unit 207 controls the execution unit 204 so as to preferentially execute a specific job. Here, "preferentially" refers to temporarily interrupting the specific operation being currently executed and executing another operation earlier than the specific operation.

Operation of Exemplary Embodiment

Figure 5:
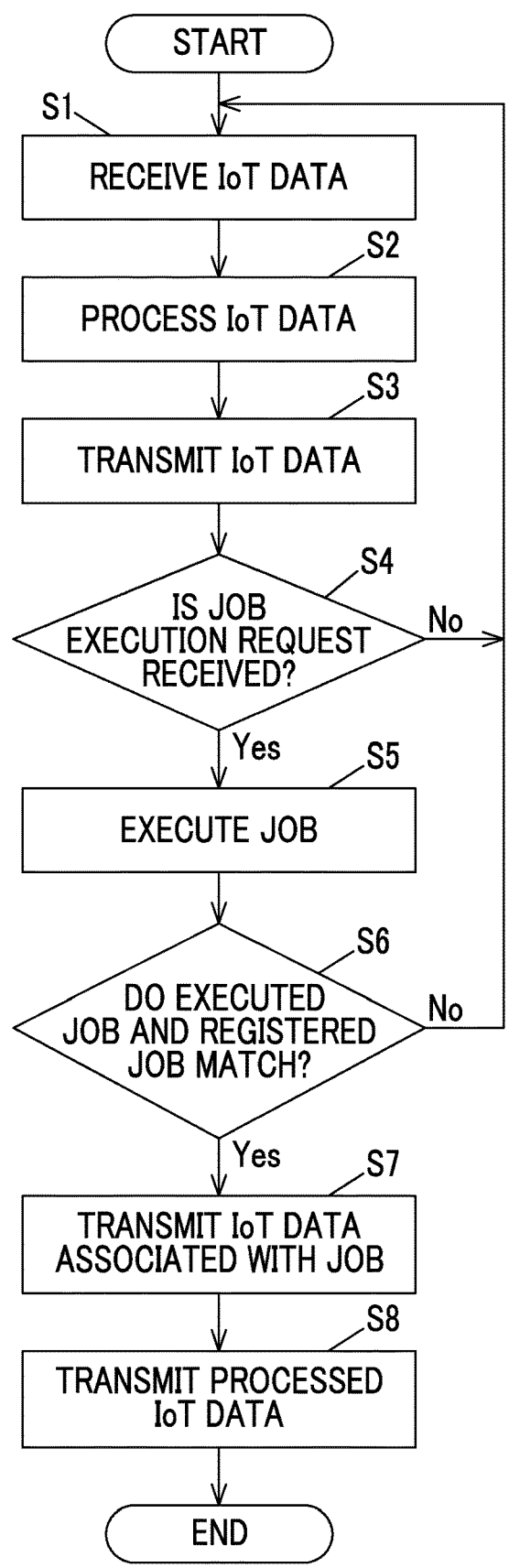
FIG. 5 is a flowchart illustrating an example of an operation of the image forming apparatus illustrated in FIG. 1.

Next, an example of the operation of the image forming apparatus 2 will be described with reference to FIG. 5. FIG. 5 is a flowchart illustrating an example of the operation of the image forming apparatus 2. The IoT device 4 acquires the IoT data and transmits the acquired IoT data to the image forming apparatus 2 at predetermined time intervals (for example, at intervals of several seconds). The reception unit 200 of the image forming apparatus 2 receives the IoT data transmitted from the IoT device 4. The reception unit 200 stores the received IoT data in the IoT data table 213 of the storage section 21. That is, the reception unit 200 collects the IoT data transmitted from the IoT device 4 (S1).

Next, the processing unit 201 processes the IoT data received by the reception unit 200 (S2). Next, the transmission unit 202 transmits the IoT data processed by the processing unit 201 to the server device 5 (S3).

The operations of steps S1 to S3 are repeatedly and continuously executed at predetermined time intervals while the reception unit 200 does not receive a job execution request (S4: No). That is, the operations of steps S1 to S3 are executed in real time. In addition, the operation of the process related to step S2 and the operation of transmission related to step S3 may be performed in the background. In addition, collection of IoT data may be executed according to a well-known load distribution algorithm such as a round robin method.

After the authentication of the user by the authentication unit 203 is established based on the operation by the user, that is, after the user logs in to the image forming apparatus 2, in a case where the reception unit 200 receives a job execution request based on the operation by the user (S4: Yes), the control unit 207 controls the execution unit 204 so as to preferentially execute the job corresponding to the execution request received by the reception unit 200. The execution unit 204 executes a job corresponding to the execution request received by the reception unit 200 (S5). In addition, during the execution of the job by the execution unit 204, collection of the IoT data by the reception unit 200 may be interrupted.

Here, in a case where the user operates the operation display section 22 to make a job request, a job execution request is transmitted from the operation display section 22. Further, in a case where the user operates the terminal device 3 to make a job request, a job execution request is transmitted from the terminal device 3. In addition, the job execution request transmitted from the terminal device 3 may be transmitted to the image forming apparatus 2 through the server device 5.

The determination unit 205 refers to the IoT device registration information table 211 stored in the storage section 21, compares the type of the job executed by the execution unit 204 with the job type which is registered in the IoT device registration information table 211 and associated with the information indicating the user, and determines whether or not the job types match (S6). Here, the specification of the user to be associated with the job type may be performed, as an example, depending on whether or not the user is the operator who makes the job execution request, that is, whether or not the user is an authenticated user. Further, the user may be specified by the user information included in the job.

In a case where the type of the job executed by the execution unit 204 matches the job type which is registered in the IoT device registration information table 211 and associated with the information indicating the user (S6: Yes), the specifying unit 206 specifies the IoT device 4 associated with the job type with reference to the IoT device registration information table 211 and specifies the IoT data transmitted from the specified IoT device 4 with reference to the IoT data table 213. In other words, the specifying unit 206 associates a job executed by the execution unit 204 with the IoT data.

Next, the control unit 207 controls the processing unit 201 so as to process the IoT data associated with the job executed by the execution unit 204 and controls the transmission unit 202 so as to transmit the processed IoT data to the server device 5.

The processing unit 201 processes the IoT data associated with the executed job, based on the control by the control unit 207 (S7). Next, the transmission unit 202 transmits the processed IoT data to the server device 5, based on the control by the control unit 207 (S8).

In addition, in the above example, for the sake of convenience of explanation, the scene where the reception unit 200 receives the job execution request after the operation of step S3 has been described as an example, but the timing when the reception unit 200 receives the job execution request is not limited thereto, and the timing may be a timing immediately after the data collection in step S1, immediately after data processing in step S2, during the data collection in step S1, during the data processing in step S2, or during the data transmission in step S3.

Control of job and IoT data

Figure 6:
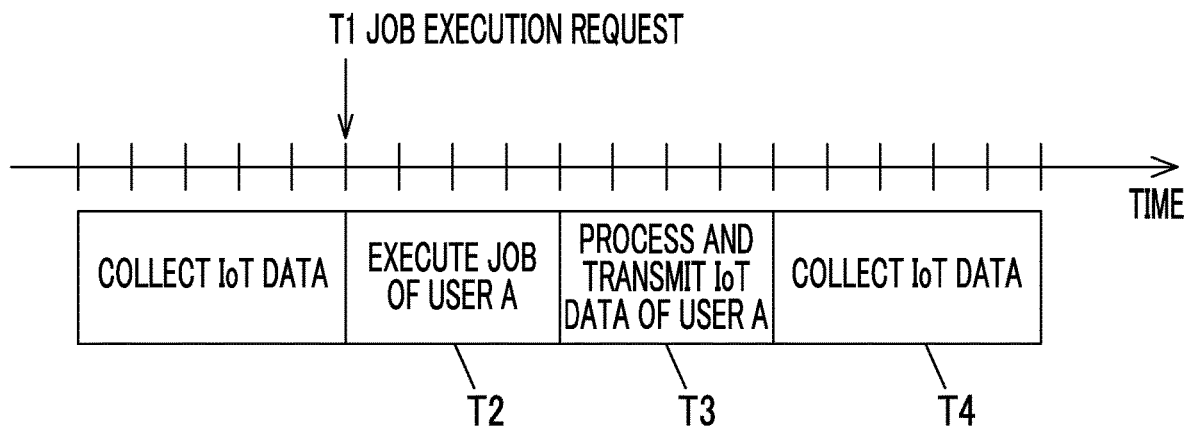
FIG. 6 is a diagram schematically illustrating an example of control of a job and IoT data.
Figure 7A:
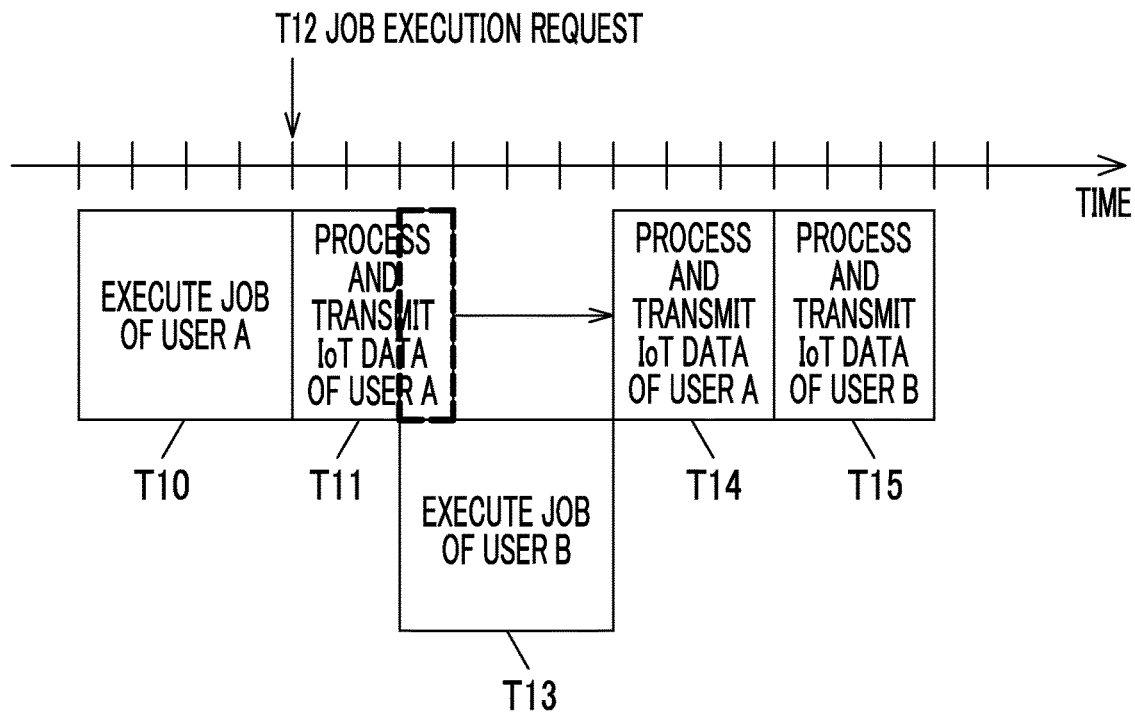

Next, an overview of control of a job and IoT data will be described with reference to FIG. 6 and FIG. 7. FIG. 6 is a diagram schematically illustrating an example of control of a job and IoT data. FIGS. 7A and 7B are diagrams schematically illustrating an example of control of a job and IoT data, FIG. 7A is a diagram showing an example in a case where a job execution request is made during transmission of the IoT data, and FIG. 7B is a diagram showing an example in a case where an urgent execution request is made during the transmission of the IoT data. The horizontal axis in each of FIG. 6 and FIGS. 7A and 7B indicates time. The vertical solid line in each of FIG. 6 and FIGS. 7A and 7B represents an example of the time in a case where the reception unit 200 receives IoT data. That is, the intervals between the vertical solid lines indicate an example of the time interval at which the reception unit 200 receives IoT data. Hereinafter, as an example, a case will be described where the reception unit 200 receives a job execution request based on an operation by a specific user (hereinafter, also referred to as "user A") when the IoT data is collected by the reception unit 200.

1. CONTROL EXAMPLE 1

As shown in FIG. 6, in a case where the reception unit 200 receives an execution request of a job based on the operation by the user A (also simply referred to as "job of user A") (T1), the execution unit 204 preferentially executes a job corresponding to the execution request (T2). Here, "preferentially" refers to interrupting collection of new IoT data by the reception unit 200, and preferentially executing the job by the execution unit 204 prior to collection of IoT data by the reception unit 200.

In a case where the execution of the job by the execution unit 204 is completed, the processing unit 201 processes IoT data related to the user A (also simply referred to as "IoT data of user A"). Further, the transmission unit 202 transmits the processed IoT data related to the user A to the server device 5 (T3).

In a case where the transmission of the IoT data related to the user A by the transmission unit 202 is completed, the reception unit 200 resumes the interrupted collection of the IoT data (T4).

2. CONTROL EXAMPLE 2

As shown in FIG. 7A, after the execution unit 204 executes the job of the user A (T10), during the processing by the processing unit 201 and the transmission to the server device 5 by the transmission unit 202 of IoT data of the user A (T11), in a case where the reception unit 200 receives an execution request of a job (also simply referred to as "job of user B") based on the operation by another specific user (hereinafter also referred to as "user B") (T12), the execution unit 204 preferentially executes a job corresponding to the job execution request of the user B (T13). Here, "preferentially" refers to interrupting the processing by the processing unit 201 and the transmission to the server device 5 by the transmission unit 202 of IoT data and executing the job of the user B by the execution unit 204 first. In addition, the job of the user A is an example of the first function. The job of the user B is an example of the second function.

In a case where the execution of the job of the user B by the execution unit 204 is completed, the control unit 207 controls the transmission unit 202 to preferentially transmit the IoT data of the user A to the server device 5. That is, the processing unit 201 and the transmission unit 202 resumes the interrupted processing and transmission to the server device 5 of IoT data of the user A (T14). Here, "preferentially" refers to transmitting IoT data of the user A to the server device 5 prior to IoT data of the user B.

In a case where the processing and transmission to the server device 5 of IoT data of the user A are completed, subsequently, the processing unit 201 and the transmission unit 202 process the IoT data of the user B and transmit the data to the server device 5 (T15).

3. CONTROL EXAMPLE 3

As shown in FIG. 7B, during the processing by the processing unit 201 and the transmission to the server device 5 by the transmission unit 202 of IoT data of the user A (T11), in a case where the reception unit 200 receives a signal indicating the occurrence of a system failure (system fault) (T12), the execution unit 204 preferentially executes the function for recovering the system fault (T13). In addition, the function of recovering the system fault is an example of a job.

In a case where the execution of the function of recovering the system fault by the execution unit 204 is completed, the processing unit 201 and the transmission unit 202 resumes the interrupted processing and transmission to the server device 5 of IoT data of the user A (T14). In addition, in FIG. 7B, the same reference numerals as in FIG. 7A are attached to those performing the same operations as the steps shown in FIG. 7A, respectively.

MODIFICATION EXAMPLE 1

In the above-described exemplary embodiment, in the IoT device registration information table 211, the specific job and the IoT data are associated with each other by associating the specific job with the IoT device 4 through the information indicating the user, but the specific job and the IoT data may be associated with each other by associating the specific job with the IoT device 4 without passing through the information indicating the user.

In this case, the control section 20 may not be made to function as the authentication unit 203, and the user authentication information table 214 may not be provided in the storage section 21. Further, in the IoT data table 213, the IoT data may be registered in association with only the IoT device 4. Modification Example 1 has a merit particularly in the case where the image forming apparatus 2 is shared among plural people without individually identifying users.

MODIFICATION EXAMPLE 2

In the above-described example, in the IoT device registration information table 211, a job and IoT data are associated with each other by associating the type of the function of the image forming apparatus 2 with the IoT device 4, but it is not necessarily limited to this form. That is, an object to be associated with the IoT device 4 is not limited to the type of a function. For example, an object to be subject to the execution of a function, such as a reading object (for example, a receipt, a form, or the like) in the scan function, may be associated with the IoT device 4. In this way, a function and IoT data may be associated through the object.

Although the exemplary embodiments of the present invention have been described above, the exemplary embodiments of the present invention are not limited to the above exemplary embodiments, and various modifications and implementations are possible within the scope not changing the gist of the present invention. For example, the type of the function of the image forming apparatus 2 is used, but a new function obtained by combining some of the functions may be used.

Parts or all of the units of the control section 20 may be configured with hardware circuits such as a field programmable gate array (FPGA) and an application specific integrated circuit (ASIC).

Further, it is possible to omit or change a part of the constituent elements of the above exemplary embodiments within the scope not changing the gist of the present invention. Further, steps may be added, deleted, changed, and exchanged in the flow of the above exemplary embodiment within the scope not changing the gist of the present invention. The program used in the above exemplary embodiments maybe provided by being recorded in a computer readable recording medium such as a CD-ROM, or may be stored in an external server such as a cloud server and used through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor configured to:
    collect data from communication equipment;
    transmit the data to an external apparatus;
    execute a function of the information processing apparatus;
    associate the function with the collected data; and
    control the transmission so as to transmit the data associated with the executed function to the external apparatus,
    wherein the processor controls the execution so as to preferentially execute a function corresponding to an execution request, in a case where the execution request for requesting execution of the function is made, while the processor collects the data from the communication equipment or while the processor transmits the data to the external apparatus,
    wherein in a case where the preferentially executed function is set to a first function, the processor controls the execution so as to preferentially execute a second function, in a case where a second execution request for requesting execution of the second function is made after the first function, while the processor transmits the data associated with the first function to the external apparatus, and controls the transmission so as to preferentially transmit the data associated with the first function to the external apparatus after execution of the second function.

2. The information processing apparatus according to claim 1, the processor configured to:
    store related information in which information indicating the function, information indicating the communication equipment, and information indicating a user are associated with each other,
    associate the executed function with the collected data, based on the related information.

3. The information processing apparatus according to claim 2,
    wherein the information indicating the function includes information indicating a type of the function.

4. The information processing apparatus according to claim 3,
    wherein the information indicating the communication equipment includes an equipment name of the communication equipment and identification information for identifying the communication equipment.

5. The information processing apparatus according to claim 4,
    wherein the identification information for identifying the communication equipment includes a certificate of the communication equipment.

6. The information processing apparatus according to claim 2,
    wherein the information indicating the communication equipment includes an equipment name of the communication equipment and identification information for identifying the communication equipment.

7. The information processing apparatus according to claim 6,
    wherein the identification information for identifying the communication equipment includes a certificate of the communication equipment.

8. A non-transitory computer readable medium storing a program causing a computer to execute a process, the process comprising:

collecting data from communication equipment;
transmitting the data to an external apparatus;
executing a function of an information processing apparatus;
associating the function with the collected data;
controlling the transmission so as to transmit the data associated with the executed function to the external apparatus; and
controlling the execution so as to preferentially execute a function corresponding to an execution request, in a case where the execution request for requesting execution of the function is made, while collecting the data from the communication equipment or while transmitting the data to the external apparatus,
wherein in a case where the preferentially executed function is set to a first function, controlling the execution so as to preferentially execute a second function, in a case where a second execution request for requesting execution of the second function is made after the first function, while transmitting the data associated with the first function to the external apparatus, and controlling the transmission so as to preferentially transmit the data associated with the first function to the external apparatus after execution of the second function.

* * * * *